United States Patent
Coaxum et al.

(10) Patent No.: US 10,877,234 B2
(45) Date of Patent: Dec. 29, 2020

(54) FIBER OPTIC MULTIPORT HAVING DIFFERENT TYPES OF PORTS FOR MULTI-USE

(71) Applicant: CORNING OPTICAL COMMUNICATIONS LLC, Hickory, NC (US)

(72) Inventors: Larry Reginald Coaxum, Garnet Valley, PA (US); Leydys Deniss De Jesús, Huntersville, NC (US)

(73) Assignee: Corning Optical Communications LLC, Charlotte, NC (US)

(*) Notice: Subject to any disclaimer, the term of this patent is extended or adjusted under 35 U.S.C. 154(b) by 0 days.

(21) Appl. No.: 16/190,393

(22) Filed: Nov. 14, 2018

(65) Prior Publication Data

US 2019/0079260 A1 Mar. 14, 2019

Related U.S. Application Data

(63) Continuation of application No. PCT/US2017/032081, filed on May 11, 2017.

(60) Provisional application No. 62/341,947, filed on May 26, 2016.

(51) Int. Cl.
*G02B 6/44* (2006.01)
*G02B 6/38* (2006.01)

(52) U.S. Cl.
CPC ......... *G02B 6/4472* (2013.01); *G02B 6/3897* (2013.01)

(58) Field of Classification Search
CPC .................. G02B 6/3897; G02B 6/4472
See application file for complete search history.

(56) References Cited

U.S. PATENT DOCUMENTS

| 5,778,122 | A  | 7/1998  | Giebel et al. |
| 7,302,152 | B2 | 11/2007 | Luther et al. |
| 7,653,282 | B2 | 1/2010  | Blackwell, Jr. et al. |
| 8,180,191 | B2 | 5/2012  | Blackwell, Jr. et al. |
| 8,755,663 | B2 | 6/2014  | Makrides-Saravanos et al. |

(Continued)

FOREIGN PATENT DOCUMENTS

| WO | 2010093794 A1 | 8/2010 |
| WO | 2014123940 A1 | 8/2014 |

OTHER PUBLICATIONS

Canadian Patent Application No. 3025704; Office Action dated Nov. 5, 2019; Canada Patent Office; 9 pgs.

(Continued)

*Primary Examiner* — Daniel Petkovsek
(74) *Attorney, Agent, or Firm* — Michael E. Carroll, Jr.

(57) ABSTRACT

A fiber optic multiport having a housing with an enclosure defining an interior of the housing is disclosed. A plurality of ports is coupled to the housing, and includes at least one input port and a plurality of output ports. A plurality of fiber optic adapters is positioned in respective ones of the plurality of ports. The fiber optic adapters are configured to receive and connect optical fibers at an interior and an exterior connection side. A plurality of optical fibers is disposed within the interior of the housing. Each of the plurality of optical fibers is routed to at least one of the fiber optic adapters at the interior connection side. Port connection indicia visibly discernible from the exterior of the multiport are indicative of a connection type accessible via the respective one of the plurality of output ports.

37 Claims, 7 Drawing Sheets

(56) References Cited

U.S. PATENT DOCUMENTS

| | | | |
|---|---|---|---|
| 8,985,862 B2* | 3/2015 | Cote | G02B 6/3897 |
| | | | 385/59 |
| 9,057,862 B2 | 6/2015 | Strasser et al. | |
| 9,279,951 B2* | 3/2016 | McGranahan | G02B 6/4452 |
| 10,133,019 B2 | 11/2018 | Kowalczyk et al. | |
| 2004/0240807 A1* | 12/2004 | Frohlich | G02B 6/3895 |
| | | | 385/100 |
| 2008/0069511 A1 | 3/2008 | Blackwell, Jr. et al. | |
| 2013/0100900 A1 | 4/2013 | Lee et al. | |
| 2014/0021962 A1 | 1/2014 | Barnaby et al. | |
| 2015/0100555 A1 | 4/2015 | Tremblay et al. | |
| 2015/0260936 A1 | 9/2015 | Newbury et al. | |
| 2015/0268434 A1 | 9/2015 | Barnette, Jr. et al. | |
| 2016/0041356 A1 | 2/2016 | Wang et al. | |

OTHER PUBLICATIONS

International Search Report and Written Opinion of the International Searching Authority; PCT/US2017/032081; dated August 21, 2017; European Patent Office.

* cited by examiner

FIG. 1

PRIOR ART

FIBER OPTIC MULTIPORT HAVING DIFFERENT TYPES OF PORTS FOR MULTI-USE

CROSS-REFERENCE TO RELATED APPLICATIONS

This application is a continuation of International Application No. PCT/US17/32081, filed on May 11, 2017, which claims the benefit of priority to U.S. Application No. 62/341,947, filed on May 26, 2016. both applications being incorporated herein by reference.

BACKGROUND

The disclosure relates generally to fiber optic connection assemblies, including multiports, and more particularly to connection assemblies having different types of port connections for multi-use applications. The multiports disclosed may also comprise externally visible port indicia for discerning the port connection type for making a proper connection to the fiber optic network.

As a result of the ever-increasing demand for broadband communications, involving voice, video and data transmission, telecommunication and cable media service providers and/or operators are expanding their fiber optic networks to increase their networks' capacity, dependability and reach to provide more services, applications and information to more subscribers. To facilitate this increased capacity, dependability and reach, the fiber optic networks employ additional fiber optic cable, hardware and components arranged in specifically designed architectures. This results in the fiber optic networks becoming more complex and their design more sophisticated to be able to deliver the most efficient and cost-effective optical communication service to meet the diverse needs of varied subscribers in different locations in the fiber optic network.

As the architectures increase in complexity and sophistication, so too do the fiber optic network devices in the network. Accordingly, instead of a fiber optic network device being used just for a local convergence point, it may need to be used in new and complex network architectures. In this regard, the fiber optic network device may need to be designed for multiple purposes with different ports of the fiber optic network device being designated as the port to access for a specific purpose. However, since the fiber optic devices typically are installed outside in challenging and rugged environments, they are pre-connected in the factory and shipped to the field sealed, with each output port connected in a standard manner.

This way, any port may be used for downstream connection in the fiber optic network. If there is any port designation, it typically is limited to the ports being sequentially numbered.

Figure 1:
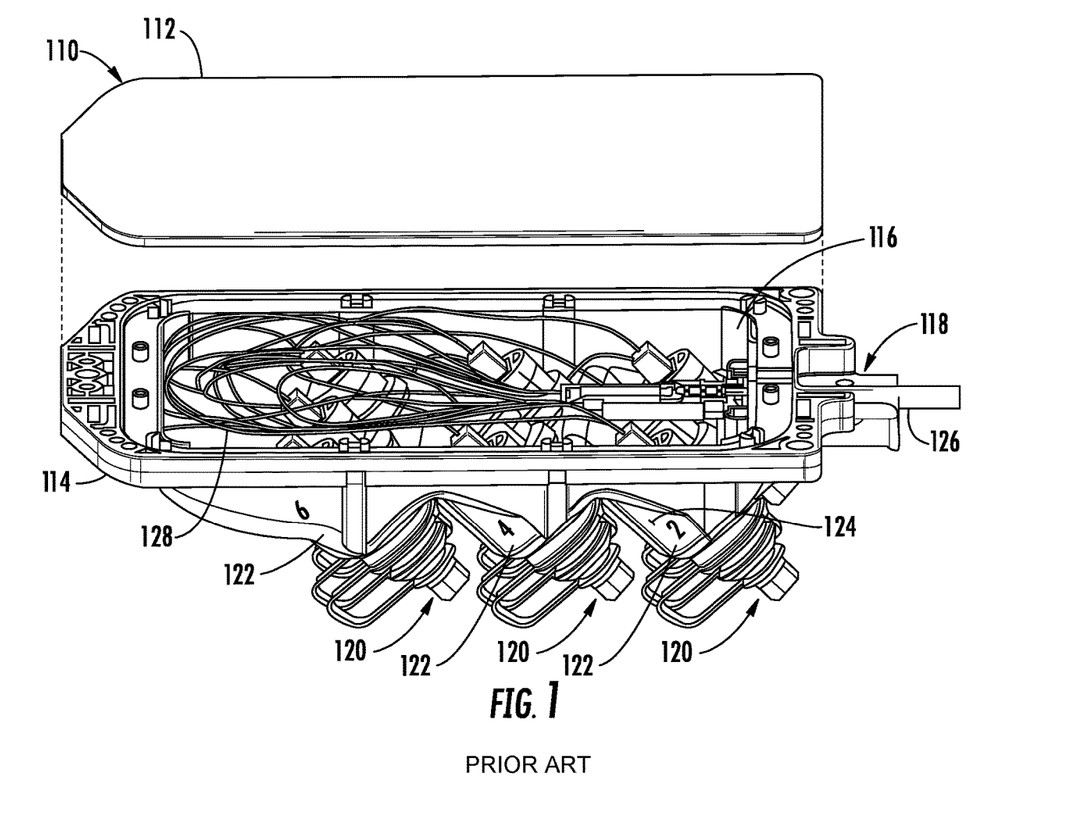
FIG. 1 is a perspective view of a conventional multiport according to the prior art with its cover separated from its base and illustrating partial exterior and interior views; wherein the multiport has a plurality of ports with optical fibers routed and connected to the plurality of ports in the interior, and with each port numbered sequentially on an exterior surface.

Referring to FIG. 1, there is shown such a conventional fiber optic network device in the form of a conventional multiport 110 having a cover 112 and a base 114. In FIG. 1, the cover 112 is shown detached from the base 114 to view an interior 116 of the multiport 110. The multiport 110 has a stub input 118 and a plurality of ports 120 each of which is numbered sequentially by a number 122. formed on a surface 124 of the multiport 110 proximal to the port 120. Except for the sequential number 122, there is no other visibly discernible marking on the multiport 110 to convey any information of the use or purpose of the particular port 120.

If there was a need to discern the particular purpose of one or more of the ports 120 in the field, the field technician may have to attempt to open the multiport 110 to gain access to its interior 116. However, since the multiport 110 is shipped to the field sealed, it is difficult, if not impractical, to open the multiport 110. If the field technician does succeed in opening the multiport 110, the field technician may have compromised the multiport's 110 ability to protect the interior 116 from the elements and other environmental conditions. Additionally, even in situations where the field technician may successfully open the multiport 110 to view the interior 116, all that will be seen is a mass of optical fibers 128 of fanning out from an incoming fiber optic cable 126 and routing to ports 120 in the interior 116 of the multiport 110. As such, no information concerning the purpose of one or more of the ports 120 can be gained from viewing the interior 116. The field technician has no way of knowing or determining the specific purpose of a port 120 either from an externally visible marking or from examination of the interior 116. While this does not matter if the multiport 110 is being used for local convergence, i.e., all ports 120 are the same and the field technician can elect to use any port 120, it does matter in complex architectures where the multiport 110 is being used for more than just local convergence and ports 120 have different purposes.

No admission is made that any reference cited herein constitutes prior art. Applicant expressly reserves the right to challenge the accuracy and pertinence of any cited documents.

SUMMARY

One embodiment of the disclosure relates to a fiber optic multiport comprising a housing comprising an enclosure defining an interior of the housing. The fiber optic multiport also comprises a plurality of ports comprising at least one input port and a plurality of output ports. The plurality of output ports are comprised of at least one first type of output port, at least one second type of output port and at least one third type of output port. The fiber optic multiport also comprises a plurality of fiber optic adapters positioned in respective ones of the plurality of output ports. The plurality of fiber optic adapters is configured to receive and connect optical fibers at an interior connection side and an exterior connection side. The fiber optic multiport also comprises a plurality of optical fibers disposed within the interior of the housing. Each of the plurality of optical fibers is routed to at least one of the plurality of fiber optic adapters at the interior connection side.

Another embodiment of the disclosure relates to a fiber optic multiport. The fiber optic multiport comprises a housing comprising an enclosure defining an interior of the housing. The fiber optic multiport also comprises a plurality of ports extended through the enclosure into the interior. The plurality of ports comprises an input port and a plurality of output ports. The fiber optic multiport also comprises a plurality of fiber optic adapters positioned in respective ones of the plurality of ports. The plurality of fiber optic adapters is configured to receive and terminate fiber optic connectors at an interior connection side accessible from the interior and at an exterior connection side accessible from an exterior of the housing. The fiber optic multiport also comprises a plurality of optical fibers disposed within the interior of the housing. Each of the plurality of optical fibers is connected to at least one of the plurality of fiber optic adapters at the interior connection side by a fiber optic connector coupled to an optical fiber, wherein each of the plurality of ports is configured to receive, exterior to the housing, a fiber optic cable comprising at least one optical fiber. The fiber optic multiport also comprises port connection indicia visibly discernible from the exterior of the multiport wherein the port connection indicia are indicative of a port connection type accessible via the respective one of the plurality of output ports proximal to the port connection indicia.

Yet another embodiment of the disclosure relates to a fiber optic multiport. The fiber optic multiport comprises a housing, wherein the housing defines an enclosure. The fiber optic multiport also comprises a first multi-fiber connector coupled to the housing. The fiber optic multiport also comprises a plurality of optical fibers connected to and extending into the enclosure. The fiber optic multiport also comprises extensions having proximal ends attached to the housing and projecting away from the housing. The extensions support sub-sets of the plurality of optical fibers. The extensions are flexible such that the extensions may bend independently of one another. The fiber optic multiport also comprises a plurality of fiber connectors. The plurality of fiber connectors receive and terminate the sub-sets of the plurality of optical fibers. The fiber optic multiport also comprises a plurality of output ports connected to respective distal ends of the extensions. The fiber optic multiport also comprises fiber optic adapters positioned in respective ones of the plurality of output ports. The fiber optic adapters are configured to receive and terminate the plurality of fiber connectors. The fiber optic multiport also comprises port connection indicia visibly discernible from the exterior of the housing. The port connection indicia are indicative of a port connection type accessible via the fiber optic adapters positioned in respective ones of the ports.

Yet another embodiment of the disclosure relates to a fiber optic multiport. The fiber optic multiport comprises a fiber optic component. The fiber optic multiport also comprises an input fiber optic cable having a first end introduced into the fiber optic component and a second end extending out of the fiber optic component. The fiber optic multiport also comprises an input fiber optic connector connected to the second end of the input fiber optic cable. The fiber optic multiport also comprises a plurality of output fiber optic cables each have a first end introduced into the fiber optic component and a second end extending from the fiber optic component. The fiber optic multiport also comprises a plurality of output fiber optic connectors connected to the second ends of the plurality of output fiber optic cables, respectively. The fiber optic multiport, also comprises a plurality of ports comprising fiber optic adapters mated to the input fiber optic connector and the plurality of output fiber optic connectors, respectively. The fiber optic multiport also comprises port connection indicia being visually discernible and located proximally to respective ones of the plurality of ports. The port connection indicia are indicative of a port connection type accessible via the respective one of the plurality of ports.

Additional features and advantages will be set forth in the detailed description which follows, and in part will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

The accompanying drawings are included to provide a further understanding, and are incorporated in and constitute a part of this specification. The drawings illustrate one or more embodiment(s), and together with the description serve to explain principles and operation of the various embodiments.

DETAILED DESCRIPTION

Figure 2:
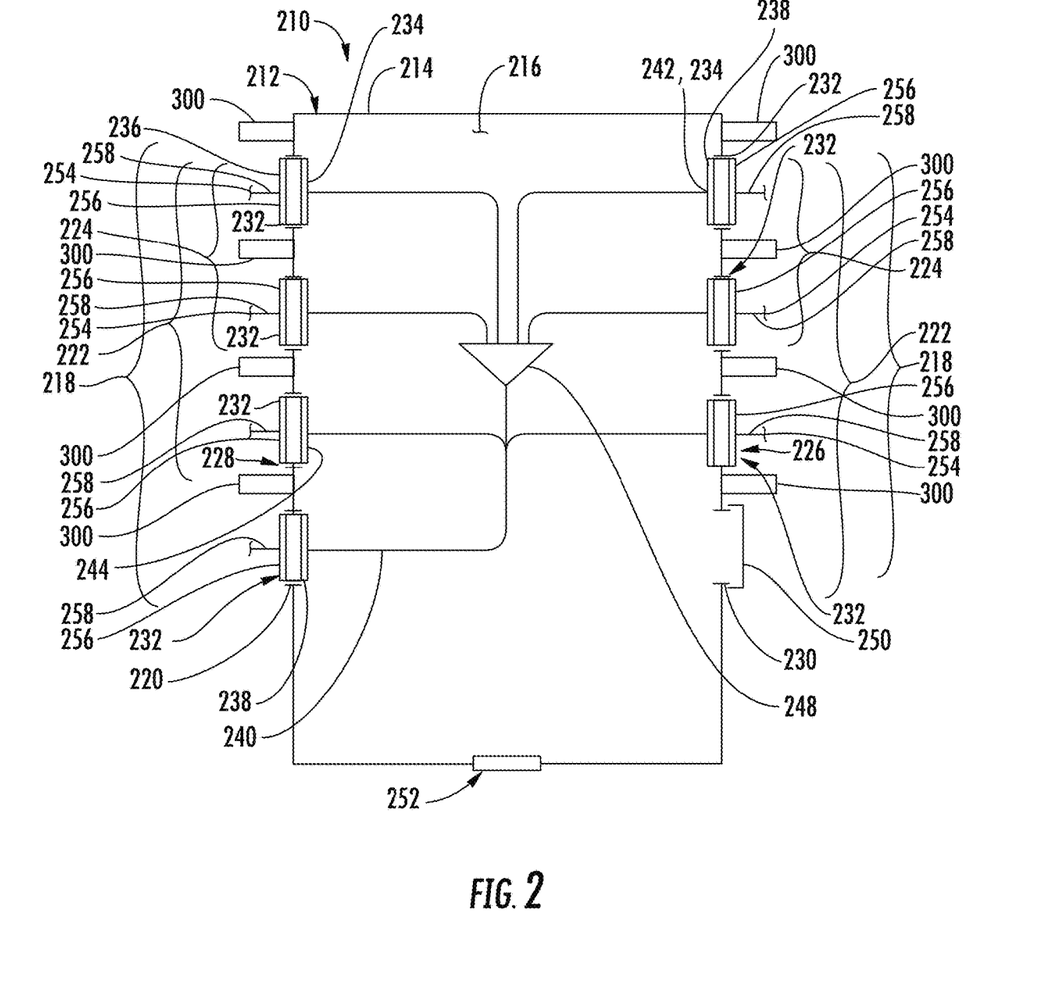
FIG. 2 is a schematic diagram of a multiport showing optical fibers routed within an interior of the multiport and connected to a plurality of ports, including an input port and a plurality of output ports, and to a fiber optic splitter, according to an exemplary embodiment.

Referring now to FIG. 2, there is shown a schematic diagram of a multiport 210 comprising a housing 212 having an enclosure 214 defining an interior 216 of the housing 211 The housing 212 has a plurality of ports 218 including an input port 220 and a plurality of output ports 222. Although in FIG. 2 the plurality of ports 218 are shown extended through the enclosure 214 into the interior 216, the disclosure contemplates other types or constructions of multiports using the concepts disclosed. For instance, a multiport may have a construction comprising one or more of the plurality of ports 218 coupled to distal ends of extensions with the proximal end of the extension coupled to the enclosure 214 and providing access into the interior 216 for providing a smaller housing for the multiport. Multiports with ports 218 coupled to distal ends of extensions will be discussed in more detail later in the description with reference to FIGS. 6 and 7.

Referring back to FIG. 2, output ports 222 include at least one first type of output port 224, at least one second type of output port 226 and at least one third type of output port 228. According to the concepts disclosed, multiports may have more than three types of output ports 222 if desired. Additionally, a fourth type of port in the form of a blank port 230 is shown. A plurality of fiber optic adapters 232 are positioned in respective ones of the plurality of ports 218. The blank port 230 is empty in that it does not have a fiber optic adapter 232 positioned within it. Fiber optic adapters 232 are configured to receive and connect optical fibers at an interior connection side 234 and an exterior connection side 236. In this regard, fiber optic adapters 232 are configured to receive and terminate fiber optic connectors 238 at the interior connection side 234 accessible from the interior 216 and at the exterior connection side 236 accessible from the exterior of the housing 212. Depending on the needs of the multi-use multiport, the fiber optic adapters 232 may be a single fiber adapter or a multi-fiber adapter based on whether the particular fiber optic adapter 232 is receiving and connecting a single fiber connector or a multi-fiber connector. The single fiber connector and multi-fiber connector may be any suitable connector, as non-limiting examples, an SC connector, TX connector or ST connector for single fibers, and a MTP, MPO, or MT-RJ for multiple fibers, respectively, any suitable ruggedized connector, such as, an OptiTap® connector, for single fiber, or OptiTip® connector, for multiple fibers, all of which are available from Corning Optical Communications LLC of Hickory, N.C. Typically, ruggedized connectors attach to the port for making the external connection to the multiport, By way of explanation, the multiport 210 may have a first type of output port 224 comprising a fiber optic adapter 232 for receiving a single-fiber ruggedized connector for the external connection, a second type of output port 226 for receiving a multi-fiber ruggedized connector for external connection and a third type of output port 228 that also receives a multi-fiber ruggedized connector. Depending on the application, the adapters for the multi-fiber connectors of the second and third types of output ports 226, 228, respectively, may receive the same type of ruggedized connector or different types of ruggedized connector. Moreover, whether the ruggedized connectors are the same or different they could also have different fiber counts, location of "communication" fibers in the connector (e.g., connector has ferrule that can accommodate 12-fibers, but only includes 4-fibers for communication connectivity), port connections through splitters, etc. for optical communication. Thus, it would be beneficial to identify the different types of ports 222 in the multiport 210 so the proper port connections may be made without damage to the device since attempting to make an improper port connection can cause damage. It is also advantageous for providing the confidence in making a quick and easy plug and play connection to the multiport.

Returning to FIG. 2, a plurality of optical fibers 240 are disposed within the interior 216 of the housing 212, each of the plurality of optical fibers 240 being routed to at least one of the fiber optic adapters 232 at the interior connection side 234. In this way, each of the plurality of optical fibers 240 is connected to at least one of the fiber optic adapters 232 at the interior connection side 234 by a fiber optic connector 238 coupled to the optical fiber 240. The fiber optic connector 238 may be a single fiber optic connector 242 or a multi-fiber optic connector 244. The at least one third type of output port 228 has a multi-fiber fiber optic connector 244. Additionally, each of the plurality of ports 218 having a fiber optic adapter 232 is configured to receive exterior to the housing 212 a fiber optic cable 254 having a fiber optic connector 256 coupled to an optical fiber 258. Since blank port 230 is empty, a port cap 250 may be used to cover the blank port 230. Additionally, although multiport 210 may have a stub input 252, in the multiport 210 of FIG. 2 the stub input 252 is not used.

Multiport 210 includes an optical splitter 248 having 1:N ratio, indicating that the optical splitter 248 splits one (1) incoming optical signal into "N" outgoing optical signals, where "N" may be any number, as non-limiting examples, 2, 4, 6, 8, 16, 32. Accordingly, although FIG. 2 shows the optical splitter 248 as having one (1) incoming line and four (4) outgoing lines, that is for representational purposes only and it should be understood that a single line shown in FIG. 2 does not necessarily indicate one (1) optical fiber or one (1) optical signal. In other words, the optical splitter 248 in FIG. 2 is not limited to a 1×4 optical signal split. At least one first type of output port 224 is in optical communication with the optical splitter 248 and the at least one second type of Output port 226 is not in optical communication with the optical splitter 248, Other variations of multiports may have multiple splitters as part of the device.

Continuing to refer to FIG. 2, the multiport 210 also includes port connection indicia 300 visibly discernible from the exterior of the multiport 210. The port connection indicia 300 is indicative of a port connection type accessible via the respective one of the plurality of ports 218 proximal to the port connection indicia 300. While the port connection indicia 300 are generally shown FIG. 2, they may be one or more of a first port connection indicia type 302, a second port connection indicia type 304 and a third port connection indicia type 306, which are not shown in FIG. 2, but will be described in more detail later and with reference to other figures. The manner and layout for identifying the different types of ports may use any suitable kind of identifiers to convey the information for the port type. Moreover, the port connection indicia 300 may use more than one port connection indicia 300 type as an identifier to convey information for the given port. As examples, the first port connection indicia type 302 may be an alphanumeric or character tag, the second port connection indicia type 304 may be a color, and the third port connection indicia type 306 may be a length of an extension leg, for multiports with one or more of the plurality of ports 218 coupled to distal ends of extensions as mentioned above. In other variations, multiports can include a port connection indicia 300 configured as a legend for decoding one or more of the port connection indicia 300. Although multiports may include several different port connection indicia 300 for port identification, a single type of port connection indicia 300 such as a color-coding may be suitable to identify the different type of output ports 222.

The port connection type may relate to any characteristic of or specific information concerning the particular port and/or its purpose. As non-limiting examples, the port connection type may relate to (i) the port's basic function, e.g., an input or output port; (ii) the output port's particular function, e.g., drop port, pass-through, small cell service; (iii) the number of optical fibers accessible via the port; (iv) the fiber optic connector type, single fiber or multi-fiber; (v) whether the port is in optical communication with a splitter; (vi) any other characteristic, information or purpose. By way of explanation, Table 1 below lists examples of port connection types along with exemplary first port connection indicia type 302, second port connection indicia type 304 and third port connection indicia type 306:

TABLE 1

| PORT CONNECTION TYPE | | PORT CONNECTION INDICIA 300 | | |
|---|---|---|---|---|
| | FUNCTION | ALPHANUMERIC/ CHARACTER 302 | COLOR 304 | EXTENSION LENGTH 306 |
| PORT TYPE | | | | |
| INPUT | NETWORK-SIDE | I | COLOR 1 | LENGTH 1 |
| OUTPUT | SUBSCRIBER-SIDE | | | |
| FIRST TYPE OF OUTPUT | DROP | D | COLOR 2 | LENGTH 2 |
| SECOND TYPE OF OUTPUT | WIRELESS SERVICE | WS | COLOR 3 | LENGTH 3 |
| THIRD TYPE OF OUTPUT | PASS-THROUGH | PT | COLOR 4 | LENGTH 4 |
| BLANK | NO FIBER | B | COLOR 5 | — |
| FIBER COUNT (NUMBER OF FIBERS) | | 1-32 | — | — |
| CONNECTOR TYPE | | | | |
| SINGLE FIBER | | S | — | — |
| MULTI-FIBER | | M | — | — |
| SIGNAL SPLIT RATIO | | "1:N" | — | — |

Port connection types listed in Table 1 should not be considered as limiting. Any additional and/or more detailed information may be included. Such additional or more detailed information may include, without limitation, the connector type may include a designation of the specific connector, e.g., SC, LC, ST, MTP, MPO, or MT-RJ; optical splitter information may be included to indicate a centralized or distributed split aspect. Also, information may include the type or character of optical service accessible at a port. As a non-limiting example, in Table 1, a wireless service is listed as a second type of output port. Accessing the second type of output port may provide for optical service extension to small cell antenna systems. Other types or character of optical service may also be included as a port connection type. With reference to Table 1, the first port connection indicia type 302 for a particular port connection type may be built or developed using the information in Table 1 above. For example, a first port connection indicia type 302 may be arranged in the following sequence:

Port Type+Fiber Count+Connector Type+Signal Split Ratio

Various embodiments will be further clarified by the following examples.

EXAMPLE 1

Port Type (Function): Drop
Fiber Count: 1
Connector Type: Single-Fiber
Signal Split Ratio: 1:4
Thus, the first port connection indicia 302 may convey one or more of these characteristics to the user. By way of example, the first port connection indicia type 302 may be disclosed to the user using alpha-numeric characters such as:
"D-1-S-1:4"
Additionally, the second port connection indicia type 304 may be an adapter cover painted Color 2, the color designated for drop ports, for example, "black." Further, if the multiport 210 has one or more of the plurality of ports 218 coupled to distal ends of extensions, second port connection indicia type 304 may be a colored sleeve installed on the extension. Also, the third port connection indicia type 306 may be length of the extension, Length 2. Thus, the user may be able to identify the type of output port by using one or more of the port connection indicia 300. For instance, if the user was not an experienced field technician, he or she might feel more comfortable using colors as the second port connection indicia type 304 to make an optical connection to the multiport 210, whereas an experienced user may want to verify a particular port in the network along with the split ratio, pass-through ports, drop ports, etc. to make a determination of the network layout.

EXAMPLE 2

Port Type (Function): D
Fiber Count: 1
Connector Type: Single Fiber
Signal Split Ratio: 1:8
Then the first port connection indicia type 302 may be: "D-1-S-1:8"
Additionally, the second port connection indicia type 304 may be an adapter cover painted Color 2, the color designated for drop ports, for example, "black." Further, if the multiport 210 has one or more of the plurality of ports 218 coupled to distal ends of extensions, second port connection indicia type 304 may be a colored sleeve installed on the extension. Also, the third port connection indicia type 306 may be length of the extension, Length 2. Thus, the user may be able to identify the type of output port by using one or more of the port connection indicia 300. For instance, if the user was not an experienced field technician, he or she might feel more comfortable using colors as the second port connection indicia type 304 to make an optical connection to the multiport 210, whereas an experienced user may want to verify a particular port in the network along with the split ratio, pass-through ports, drop ports, etc. to make a determination of the network layout.

EXAMPLE 3

Port Type (Function): Wireless Service
Fiber Count: 2

Connector Type: Multi-fiber
Signal Split Ratio: N/A
Then the first port connection indicia type 302 may be: "WS-2-M-X"
Additionally, the second port connection indicia type 304 may be an adapter cover painted Color 3, the color designated for wireless services ports, for example, "red." Further, if the multiport 210 has one or more of the plurality of ports 218 coupled to distal ends of extensions, second port connection indicia type 304 may be a colored ("red") sleeve installed on the extension. Also, the third port connection indicia type 306 may be the length of the extension, Length 3. Length 3 may be the same or different than Length 2. Additionally, the "X" in the signal split ratio position indicates that the two optical fibers 240 at this output port 218 are not in optical communication with the optical splitter 248, and have passed through the multiport 210 directly from the input port 220.

EXAMPLE 4

Port Type (Function): Drop
Fiber Count: 8
Connector Type: Multi-fiber
Signal Split Ratio: 1:32
Then the first port connection indicia type 302 may be: "D-8-M-1:32"
Additionally, the second port connection indicia type 304 may be an adapter cover painted Color 2, the color designated for drop ports, for example, "black." Further, if the multiport 210 has one or more of the plurality of ports 218 coupled to distal ends of extensions, second port connection indicia type 304 may be a colored sleeve installed on the extension. Also, the third port connection indicia type 306 may be length of the extension, Length 2. Moreover, the signal split ratio of 1:32 and the fiber count of 8 indicates that 8 optical fibers are in optical communication with the splitter and are 8 of the 32 fibers split by optical splitter 248 routed to this drop port.

EXAMPLE 5

Port Type (Function): Input
Fiber Count: 4
Connector Type: Multi-fiber
Signal Split Ratio: 1:4
Then the first port connection indicia type 302 may be: "1-4-M-1:4"
Additionally, the second port connection indicia type 304 may be an adapter cover painted Color 1, the color designated for input port, for example, "blue." Further, if the multiport 210 has one or more of the plurality of ports 218 coupled to distal ends of extensions, second port connection indicia type 304 may be a colored ("blue") sleeve installed on the extension. Also, the third port connection indicia type 306 may be the length of the extension, Length 1. Length 1 may be the same or different than Length 2 or Length 3. Additionally, the signal split ratio of 1:4 indicates that 1 of the 4 optical fibers inputted is in optical communication with the optical splitter 248 and the optical signal in that optical fiber is split by the optical splitter 248 into 4 optical signals each carried by separate optical fibers.

EXAMPLE 6

Port Type (Function): Input
Fiber Count: 4
Connector Type: Multi-fiber
Signal Split Ratio: 1:16
Then the first port connection indicia type 302 may be: "1-4-M-1:16"
Additionally, the second port connection indicia type 304 may be an adapter cover painted Color 1, the color designated for input port, for example, "blue." Further, if the multiport 210 has one or more of the plurality of ports 218 coupled to distal ends of extensions, second port connection indicia type 304 may be a colored ("blue") sleeve installed on the extension. Also, the third port connection indicia type 306 may be the length of the extension, Length 1. Length 1 may be the same or different than Length 2 or Length 3. Additionally, the signal split ratio of 1:16 indicates that 1 of the 4 optical fibers inputted is in optical communication with the optical splitter 248 and the optical signal in that optical fiber is split by the optical splitter 248 into 16 optical signals each carried by separate optical fibers.

EXAMPLE 7

Port Type (Function): Input
Fiber Count: 12
Connector Type: Multi-fiber
Signal Split Ratio: 1:32
Then the first port connection indicia type 302 may be: "1-12-M-1:32"
Additionally, the second port connection indicia type 304 may be an adapter cover painted Color 1, the color designated for input port, for example, "blue." Further, if the multiport 210 has one or more of the plurality of ports 218 coupled to distal ends of extensions, second port connection indicia type 304 may be a colored ("blue") sleeve installed on the extension. Also, the third port connection indicia type 306 may be the length of the extension, Length 1. Length 1 may be the same or different than Length 2 or Length 3. Additionally, the signal split ratio of 1:32 indicates that 1 of the 12 optical fibers inputted is in optical communication with the optical splitter 248 and the optical signal in that optical fiber is split by the optical splitter 248 into 32 optical signals each carried by separate optical fibers.

EXAMPLE 8

Port Type (Function): Pass-Through
Fiber Count: 1
Connector Type: Single Fiber
Signal Split Ratio: N/A
Then the first port connection indicia type 302 may be: "PT-1-S-X"
Additionally, the second port connection indicia type 304 may be an adapter cover painted Color 4, the color designated for pass-through port, for example, "green." Further, if the multiport 210 has one or more of the plurality of ports 218 coupled to distal ends of extensions, second port connection indicia type 304 may be a colored ("green") sleeve installed on the extension. Also, the third port connection indicia type 306 may be the length of the extension, Length 1. Length 1 may be the same or different than Length 2 or Length 3,

EXAMPLE 9

Port Type (Function): Pass-Through
Fiber Count: 8
Connector Type: Multi-fiber
Signal Split Ratio: N/A Then the first port connection indicia type 302 may be: "PT-8-M-X"

Additionally, the second port connection indicia type 304 may be an adapter cover painted Color 4, the color designated for pass-through port, for example, "green." Further, if the multiport 210 has one or more of the plurality of ports 218 coupled to distal ends of extensions, second port connection indicia type 304 may be a colored ("green") sleeve installed on the extension. Also, the third port connection indicia type 306 may be the length of the extension, Length 1. Length 1 may be the same or different than Length 2 or Length 3.

EXAMPLE 10

Port Type (Function): Blank
Fiber Count: 0
Connector Type: None
Signal Split Ratio: N/A
Then the first port connection indicia type 302 may be: "B-EMPTY" or "B-X-X-X"

Additionally, the second port connection indicia type 304 may be a port cap (there may no adapter cover since Blank ports do not have adapters) painted Color 5, the color designated for a Blank port, for example, "grey."

In this way, first port connection indicia type 302, second port connection indicia type 304, and third port connection indicia type 306, individually or in any combination, provide the necessary information visually discernible by the field technician externally from the multiport of the purpose of that particular port and the connection accessible via that port.

Figure 3:
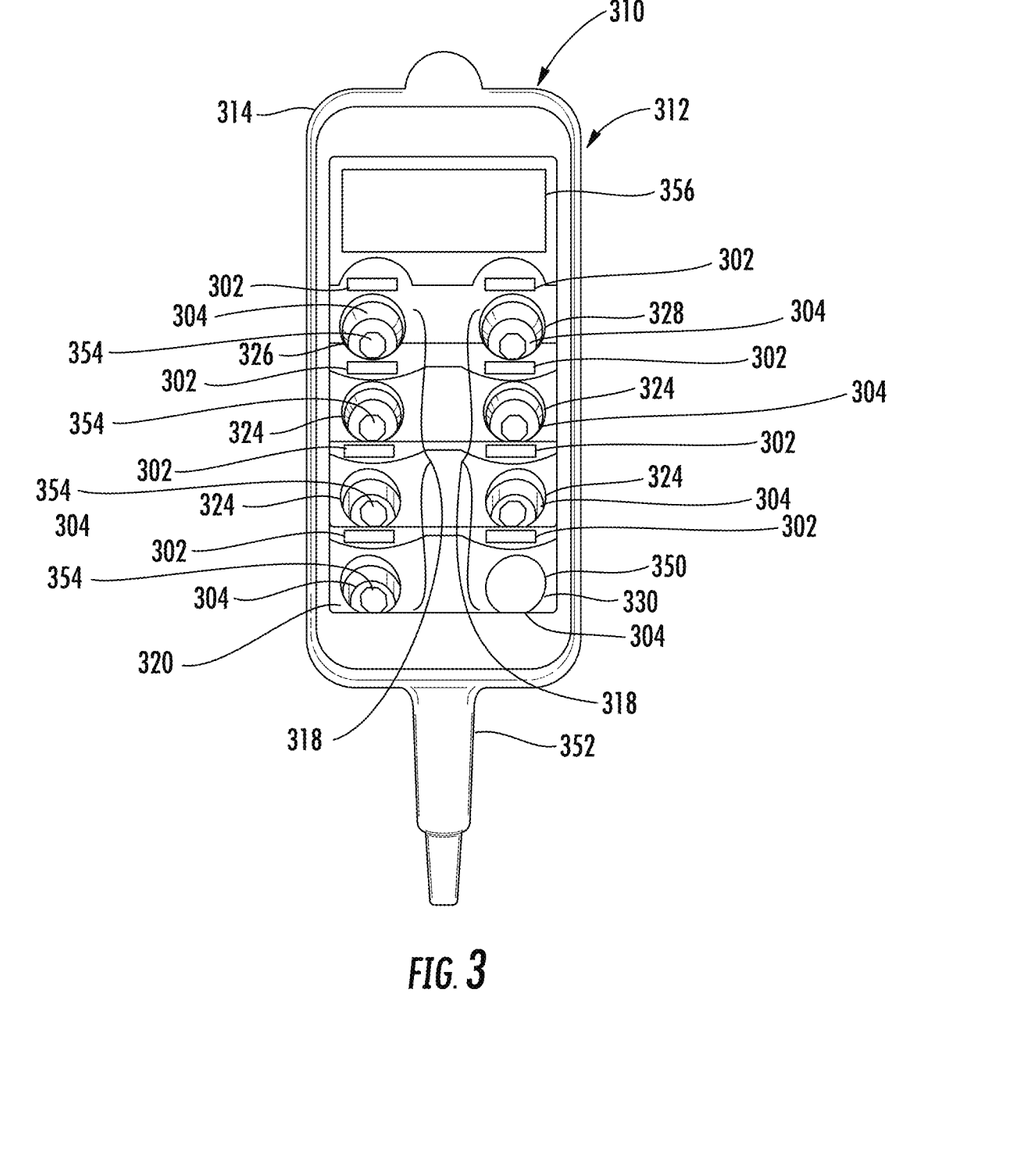
FIG. 3 is a front view of a multiport having a plurality of ports arranged in a 2×4 configuration with the ports having port connection indicia indicating a port connection type for the particular port according to an exemplary embodiment.

Referring now to FIG. 3, multiport 310 is illustrated comprising a housing 312 having an enclosure 314 and a plurality of ports 318 arranged in a 2×4 configuration. Multiport 310 has an input port 320, four (4) first type of output ports 324, a second type of output port 326, a third type of output port 328 and a fourth type of output port 330, The first type of output ports 324, a second type of output port 326, and a third type of output port 328 each have an adapter cover 354 removably attached to the port 318. The fourth type of output port 330 has a port cap 350. The adapter cover 354 is attached to the port 318 when the port 318 is not in use. When the field technician elects to connect a fiber optic cable (not shown in FIG. 3) to one of the ports 318, the field technician will remove the adapter cover 354 for that port 318. Typically, the adapter cover 354 is tethered to the port. 318 and will hang from the port 318 when removed to guard against being lost or misplaced. In this way, the adapter cover 354 remains identified with that particular port 318 even after being removed from the port 318. FIG. 3 also includes a stub input 352 that is shown as not being used.

In FIG. 3, first port connection indicia type 302 is shown proximally located to each port 318, and will indicate the first port connection indicia type 302 information for that particular port 318. Additionally, the adapter covers 354 for each of the ports 318 may be painted a color to provide second port connection indicia 304. As an example: multiport 310 may be configured to receive a fiber optic cable having 4 active optical fibers at input port 320. First port connection indicia type 302 may be positioned proximally to input port 320 and the adapter cover 354 for input port 320 may be painted color 1, or "blue" for second port connection indicia type 304. One of the input fibers may route to a fiber optic splitter (not shown in FIG. 3) and split the optical signal in that optical fiber into 4 optical signals carried by 4 separate optical fibers each routed and connected to one of the first type of output ports 324. Each of the adapter covers 354 of first type of output port 324 may be painted color 2, or "black" for second port connection indicia type 304. Another one of the input optical fibers may be routed from the input port 320 to the second type of output port 326 and connected to the adapter positioned in the output port 326 by a single fiber connector coupled to the optical fiber and function as a single fiber pass-through. The adapter cover 354 of the second type of output port 326 may be painted color 4, or "green" for second port connection indicia type 304. The remaining two optical fibers of the input optical fibers may be routed from the input port 320 to third type of output port 328 and connected to the adapter positioned in the output port 328 by a multi-fiber connector coupled to the optical fiber and function as a small cell pass-through. Each of the adapter covers 354 of third type of output port 328 may be painted color 3, or "red" for second port connection indicia type 304.

The first port connection indicia type 302 and second port connection indicia type 304 for the ports 318 of multiport 310 arranged in the port 318 configuration may be as shown in Table 2, below:

TABLE 2

| PORT 318 | | PORT 318 | |
|---|---|---|---|
| PT-1-S-X | GREEN | SC-2-M-X | RED |
| D-1-S-1:4 | BLACK | D-1-S-1x4 | BLACK |
| D-1-S-1:4 | BLACK | D-1-S-1x4 | BLACK |
| I-4-M-1:4 | BLUE | EMPTY | GREY |

Additionally, Table 2 may be replicated and made into a label 356 and attached or affixed to the multiport 310. Of course, the content of the label could also be molded into the multiport 310 if desired.

Figure 4:
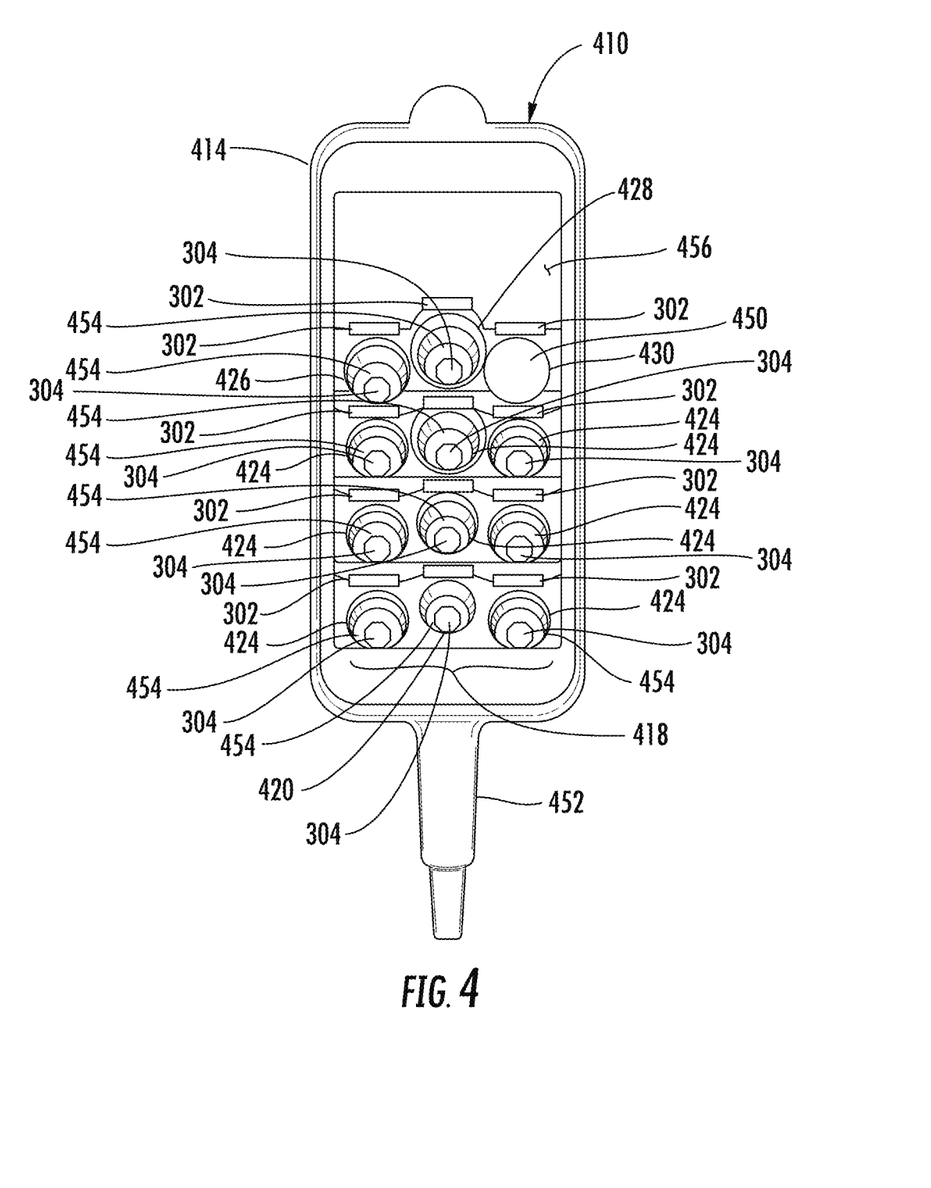
FIG. 4 is a front view of a multiport having a plurality of ports arranged in a 3×4 configuration with the ports having port connection indicia indicating the port connection type for the particular port according to an exemplary embodiment.

Referring now to FIG. 4, multiport 410 is illustrated having enclosure 414 and a plurality of ports 418 arranged in a 3×4 configuration. Multiport 410 has an input port 420, eight (8) first type of output ports 424, a second type of output port 426, a third type of output port 428 and a fourth type of output port 430. As discussed with respect to FIG. 3, the first type of output ports 424, a second type of output port 426, and a third type of output port 428 each have an adapter cover 454 removably attached to the port 418 when the port 418 is not in use. The fourth type of output port 430 has a port cap 450. Additionally the adapter cover 454 is tethered to the port 418 as discussed with respect to FIG. 3. FIG. 4 also includes a stub input 452 that is shown as not being used.

In FIG. 4, first port connection indicia type 302 is shown proximally located to each port 418, and will indicate the first port connection indicia type 302 information for that particular port 418. Additionally, the adapter covers 454 for each of the ports 418 may be painted a color to provide second port connection indicia type 304. As an example: multiport 410 may be configured to receive a fiber optic cable having 4 active optical fibers at input port 420. First port connection indicia type 302 may be positioned proximally to input port 420 and the adapter cover 454 for input port 420 may be painted color 1, or "blue" for second port connection indicia type 304. One of the input fibers may route to a fiber optic splitter (not shown in FIG. 4) and split the optical signal in that optical fiber into 8 optical signals carried by 8 separate optical fibers each routed and connected to one of the first type of output ports 424. Each of the adapter covers 454 of first type of output port 424 may be painted color 2, or "black" for second port connection indicia type 304. Another one of the input optical fibers may be routed from the input port 420 to the second type of output port 426 and connected to the adapter positioned in the second type of output port 426 by a single fiber connector coupled to the optical fiber and function as a single fiber pass-through. The adapter cover 454 of second type of output port 426 may be painted color 4, or "green" for second port connection indicia type 304. The remaining two optical fibers of the input optical fibers may be routed from the input port 420 to third type of output port 428 and connected to the adapter positioned in the third type of output port 428 by a multi-fiber connector coupled to the optical fiber and function as a small cell pass-through. Each of the adapter covers 454 of third type of output port 428 may be painted color 3, or "red" for second port connection indicia type 304.

The first port connection indicia type 302 and second port connection indicia type 304 for the ports 418 of multiport 410 arranged in the port 418 configuration of multiport 410 may be as shown in Table 3, below:

TABLE 3

| PORT 418 | | PORT 418 | | PORT 418 | |
|---|---|---|---|---|---|
| PT-1-S-X | GREEN | SC-2-M-X | RED | EMPTY | GREY |
| D-1-S-1:8 | BLACK | D-1-S-1:8 | BLACK | D-1-S-1:8 | BLACK |
| D-1-S-1:8 | BLACK | D-1-S-1:8 | BLACK | D-1-S-1:8 | BLACK |
| D-1-S-1:8 | BLACK | I-4-M-1:4 | BLUE | D-1-S-1:8 | BLACK |

Additionally, Table 3 may be replicated and made into a label 456 and attached or affixed to, or molded into the multiport 418.

Figure 5:
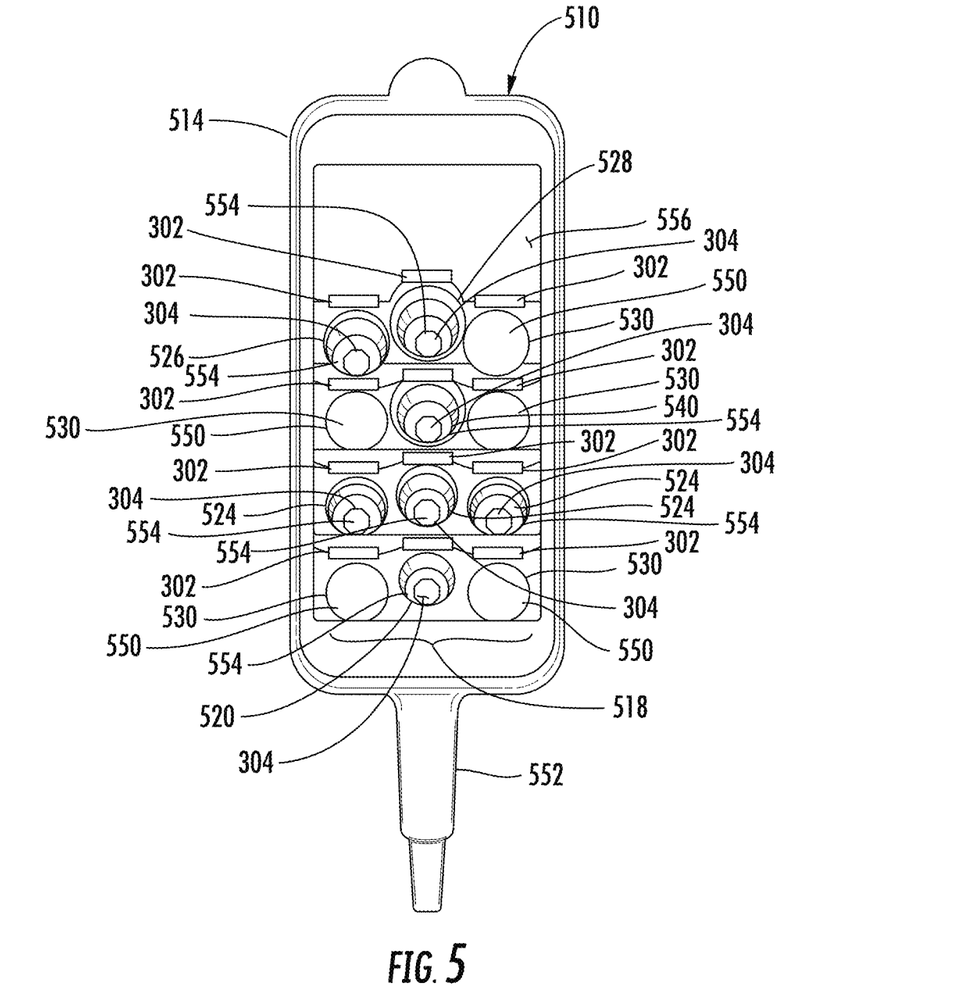
FIG. 5 is a front view of a multiport having a plurality of ports arranged in a 3×4 configuration with the ports having port connection indicia indicating the port connection type for the particular port according to an exemplary embodiment.

Referring now to FIG. 5, multiport 510 is illustrated having enclosure 514 and a plurality of ports 518 arranged in a 3×4 configuration. Multiport 510 has an input port 520, four (4) first type of output ports 524, a second type of output port 526, a third type of output port 528 and five (5) fourth type of output port 530. As discussed with respect to FIGS. 3 and 4. the first type of output ports 524, a second type of output port 526, and a third type of output port 528 each have an adapter cover 554 removably attached to the port 518 when the port 518 is not in use. The fourth type of output port 530 has a port cap 550. Additionally the adapter cover 554 is tethered to the port 518 as discussed with respect to FIGS. 3 and 4. FIG. 5 also includes a stub input 552 that is shown as not being used.

In FIG. 5, first port connection indicia type 302 is shown proximally located to each port 518, and will indicate the first port connection indicia type 302 for that particular port 518. Additionally, the adapter covers 554 for each of the ports 518 may be painted a color to provide second port connection indicia type 304. As an example: multiport 510 may be configured to receive a fiber optic cable having 12 active optical fibers at input port 520. First port connection indicia type 302 may be positioned proximally to input port 520 and the adapter cover 554 for input port 520 may be painted color 1, or "blue" for second port connection indicia type 304. One of the input fibers may route to a fiber optic splitter (not shown in FIG. 5) and split the optical signal in that optical fiber into 32 optical signals carried by 32 separate optical fibers, four each of which are routed and connected to one of the first type of output ports 524. Each of the adapter covers 554 of first type of output port 524 may be painted color 2, or "black" for second port connection indicia type 304. Eight other of the input optical fibers may be routed from the input port 520 to the second type of output port 526 and connected to the adapter positioned in the second type of output port 526 by a multi-fiber connector coupled to the 8 optical fibers and function as an eight-fiber pass-through. The adapter cover 554 of second type of output port 526 may be painted color 4, or "green" for second port connection indicia type 304. Two optical fibers of the input optical fibers may be routed from the input port 520 to third type of output port 528 and connected to the adapter positioned in the output port 528 by a multi-fiber connector coupled to the two optical fibers and function as a small cell pass-through. Each of the adapter covers 554 of third type of output port 528 may be painted color 3, or "red" for second port connection indicia type 304.

The first port connection indicia type 302 and second port connection indicia type 304 for the ports 518 of multiport 510 arranged in the port 518 configuration of multiport 510 may be as shown in Table 4 below:

TABLE 4

| PORT 518 | | PORT 518 | | PORT 518 | |
|---|---|---|---|---|---|
| PT-8-M-X | GREEN | SC-2-M-X | RED | EMPTY | GREY |
| EMPTY | GREY | D-8-M-1:32 | BLACK | EMPTY | GREY |
| D-8-M-1:32 | BLACK | D-8-M-1:32 | BLACK | D-8-M-1:32 | BLACK |
| EMPTY | GREY | I-12-M-1:32 | BLUE | EMPTY | GREY |

Additionally, Table 4 may be replicated and made into a label 556 and attached or affixed to, or molded into the multiport 518.

Figure 6:
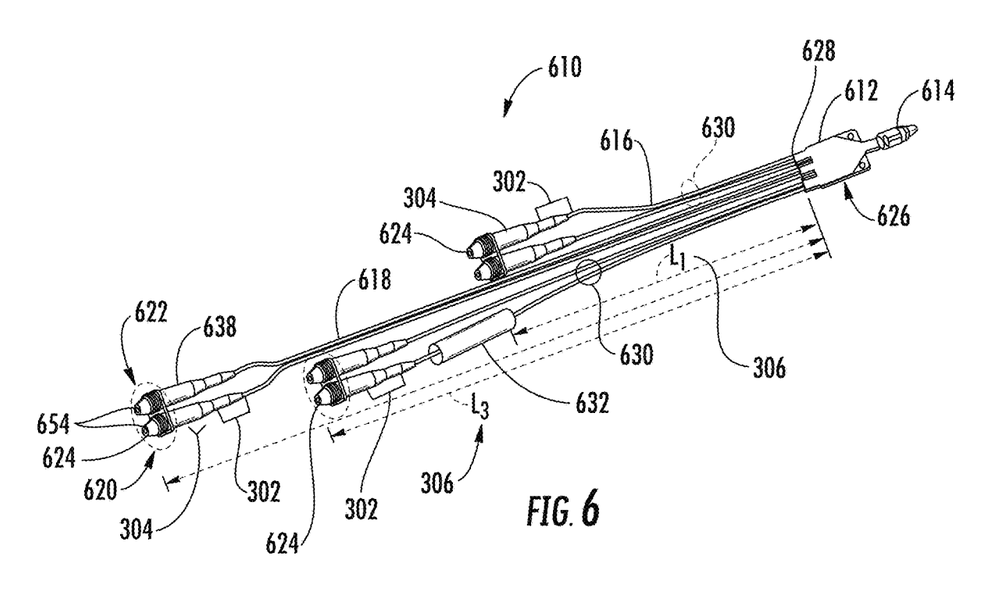
FIG. 6 is a perspective view of another multiport having a housing with an input port positioned at the housing and a plurality of output ports positioned distally from the housing on extensions with the ports having port connection indicia indicating the port connection type for the particular port according to an exemplary embodiment.

Referring now to FIG. 6, there is shown a multiport 610 having a housing 612 and an input multi-fiber connector 614 coupled to the housing 612, a plurality of optical fibers 616, extensions 618 and ports 620 with fiber optic adapters 622 positioned therein, connected to distal end 624 of the extensions 618. Output fiber optic connectors 638 are positioned in the ports 620. Although not shown in FIG. 6, the output fiber optic connectors 638 may be one of single-fiber connector 642 and multi-fiber connector 644. The housing 612 defines an enclosure 626. The plurality of optical fibers 616 are connected to and extend from the input multi-fiber connector 614 into the enclosure 626 of the housing 612. The extensions 618 have proximal ends 628 attached to the housing 612. The extensions 618 project away from the housing 612. The extensions 618 support sub-sets (e.g., one fiber each, two fibers each, different numbers of fibers per sub-set) of the plurality of optical fibers 616, and the extensions 618 may be flexible such that the extension 618 may bend independently of one another. The ports 620 may be coupled in communication through the fiber optic adapters 622 and output fiber optic connectors 638 to the input multi-fiber connector 614 by way of optical fibers 616 passing through the enclosure 626 of the housing 612. Additionally, although not shown in FIG. 6, the multiport 610 may include an optical signal splitter in the enclosure 626 of the housing 612. An optical fiber 616 may connect to the optical signal splitter with the optical signal carried by the optical fiber 616 split into multiple optical signals denoted by "N." The optical signal split will have an optical signal split ratio of 1:N. The ports 620 have removably attached adapter cover 654 covering the port 620 when the port 620 is not being used, similar to the description involving adapter cover 354, 445, and 645 as discussed with FIGS. 3, 4, and 5, respectively.

At least two of the extensions 618 are the same lengths $L_1$ as one another, such as within 5% of the longest of the lengths $L_1$ measured when both of the extensions 618 are fully extended from the housing 612 to the most distal extent of the adapter cover 654. At least two of the extensions 618 are different lengths L₁, L₂, L₃ from one another. The multiport 610 may include at least two groups 630 of extensions 618, where the extensions 618 within each group 630 are the same lengths L₁, L₂ as one another but where lengths L₁, L₂ differ between the two groups 630. As discussed above, the different lengths of the extensions 618 may be adjusted to provide a third type of port connection indicia 306. As illustrated in FIG. 6, the lengths of the different groups 630 of extensions 618 provide visually discernible indicia indicative of the port connection type accessible via the different ports 620 at the distal end 624 of each of the extensions 618 in the groups 630.

Additionally, the a first type of port connection indicia 302 and second type of port connection indicia 304 may also be used with multiport 610. In a similar fashion to multiports 310, 410 and 510 discussed with respect to FIGS. 3, 4 and 5, first type of port connection indicia 302 may be developed or built using the "Port Type+Fiber Count+Connector Type+Signal Split Ratio" structure and with reference to Table 1 above. First type port connection indicia 302 may be in the form of tags or labels attached to the individual extension 618 or ports 620. Further, second type of port connection indicia 304 may be used by applying the appropriate color to the adapter cover 654, in the same manner as done with respect to adaptor covers 354, 454 and 554, as discussed above. However, the second type of port connection indicia 304 may also be accomplished by positioning the extension 618 in colored sleeves 632.

Figure 7:
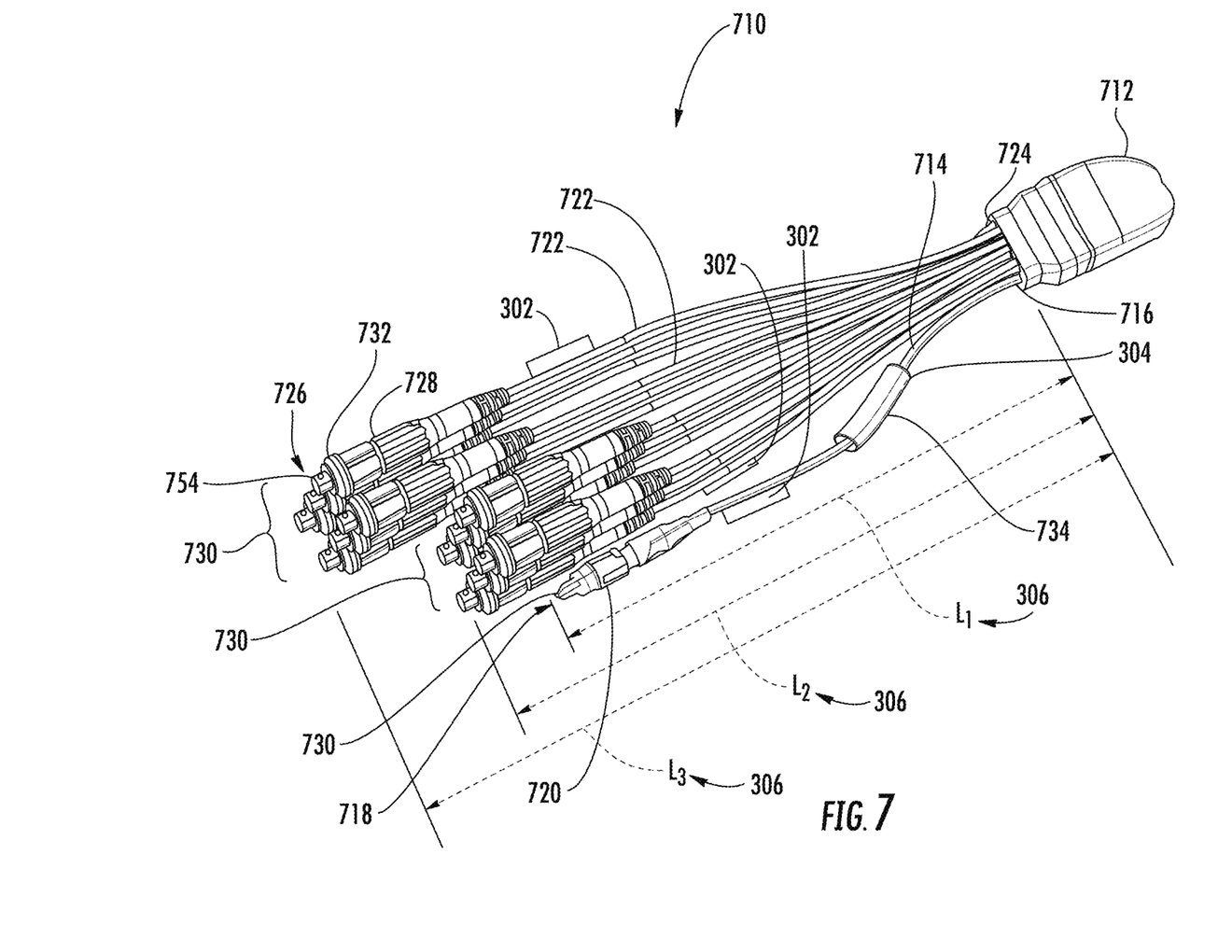
FIG. 7 is a perspective view of a fiber optic assembly with a fiber optic component and having an input fiber optic cable and a plurality of output fiber optic cables extending from the fiber optic component and with a plurality of ports having port connection indicia indicating the port connection type for the particular port according to an exemplary embodiment according to an exemplary embodiment.

Referring now to FIG. 7, there is illustrated a fiber optic assembly 710 having a fiber optic component 712. An input fiber optic cable 714 has a first end 716 introduced into the fiber optic component 712 and a second end 718 extending out of the fiber optic component 712. An input fiber optic connector 720 is connected to the second end 718 of the input fiber optic cable 714. A plurality of output fiber optic cables 722 each has a first end 724 introduced into the fiber optic component 712 and a second end 726 extending from the fiber optic component 712. A plurality of output fiber optic connectors 728 is connected to the second ends 726 of the output fiber optic cables 722, respectively. A plurality of ports 730 comprising fiber optic adapters 732 are mated to the input fiber optic connector 720 and the output fiber optic connectors 728, respectively, Additionally, the fiber optic component 712 may be an optical signal splitter. In this regard, an optical signal carried by an optical fiber in the input fiber optic cable 714 may be split into multiple optical signals denoted by "N." The optical signal split will have an optical signal split ratio of 1:N. The ports 730 have removably attached adapter covers 754 covering the port 730 when the port 730 is not being used, similar to the description involving adapter covers 354, 445, and 645 as discussed with FIGS. 3, 4, 5, respectively. Port connection indicia 300 visually discernible externally from the fiber optic assembly 710 may be located proximally to respective ones of the plurality of ports 730. The port connection indicia 300 is indicative of a port connection type accessible via the respective one of the plurality of ports 730 proximal to the port connection indicia 300.

Input fiber optic cable 714 has a length L₁ measured from the first end 716 at fiber optic component 712 to the second end 718 at the most distal extent of the adapter cover 754. At least two of the plurality of output fiber optic cables 722 are the same lengths L₂ as measured from the first end 724 at fiber optic component 712 to the second end 726 at the most distal extent of the adapter cover 754. Additionally, at least two of the plurality of output fiber optic cables 722 are the same lengths L₃ as measured from the first end 724 at fiber optic component 712 to the second end 726 at the most distal extent of the adapter cover 754. Accordingly, the input fiber optic cable 714 may have a different length L₁ from the at least two output fiber optic cables 722 having lengths L₂ or L₃. Moreover, each one of the at least two output fiber optic cables 722 may each have different lengths L₂ and L₃ from one another. As discussed above, the different lengths L₁, L₂, L₃ may be adjusted to provide a third type of port connection indicia 306. As illustrated in FIG. 7, the lengths provide visually discernible indicia indicative of the port connection type accessible via the different ports 730.

Additionally, the first type of port connection indicia 302 and second type of port connection indicia 304 may also be used with fiber optic assembly 710. In a similar fashion to multiports 310, 410 and 510 discussed with respect to FIGS. 3, 4 and 5, first type of port connection indicia 302 may be developed or built using the "Port Type+Fiber Count+Connector Type+Signal Split Ratio" structure and with reference to Table 1, above. First type port connection indicia 302 may be in the form of tags or labels attached to the input fiber optic cable 714, output fiber optic cables 722, or ports 730. Further, second type of port connection indicia 304 may be use by applying the appropriate color to the adapter cover 654, in the same manner as done with respect to adaptor covers 354, 454 and 554, as discussed above. However, second type of port connection indicia 304 may also be accomplished by positioning colored sleeves 734 around one or more of the input fiber optic cable 714 and at least one of output fiber optic cables 722.

Table 5 below, provides a summary of the color coding which may be used for the second port connection indicia type 304:

TABLE 5

| Multiport Color Code | | |
| --- | --- | --- |
| Color | Port Type | Connector Type |
| Color 1 - Blue | Input | Single Fiber (S) And/or Multi-fiber (M) |
| Color 2 - Black | Drop | Single Fiber (S) And/or Multi-fiber (M) |
| Color 3 - Red | Wireless Service | Multi-fiber (M) |
| Color 4 - Green | Pass-Through | Single Fiber (S) And/or Multi-fiber (M) |
| Color 5 - Grey | Blank | No Connector |

The colors shown and arranged in Table 5 are for example only and should not be interpreted in any way as limiting or restricting the colors that may be selected, or the purpose for which they may be applied.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

It will be apparent to those skilled in the art that various modifications and variations can be made without departing from the spirit or scope of the disclosure. Since modifications combinations, sub-combinations and variations of the embodiments incorporating the spirit and substance of the disclosure may occur to persons skilled in the art, the application should be construed to include everything within the scope of the appended claims and their equivalents.

What is claimed is:

1. A fiber optic multiport, comprising:
   a housing comprising an enclosure, wherein the enclosure defines an interior of the housing;
   a plurality of ports comprising at least one input port and a plurality of output ports, the plurality of output ports comprising at least one first type of output port, at least one second type of output port and at least one third type of output port, and port connection indicia visibly discernible from an exterior of the fiber optic multiport, wherein the port connection indicia is indicative of a port connection type of the plurality of ports accessible via the respective port and the port connection indicia comprises a first type of port connection indicia, a second type of port connection indicia, and a third type of port connection indicia;
   a plurality of fiber optic adapters positioned in respective ones of the plurality of output ports, the plurality of fiber optic adapters configured to receive and connect optical fibers at an interior connection side and an exterior connection side;
   a plurality of optical fibers disposed within the interior of the housing, each of the plurality of optical fibers routed to at least one of the plurality of fiber optic adapters at the interior connection side; and
   an optical signal splitter, wherein the at least one first type of output port is in optical communication with the optical splitter and the at least one second type of output port is not in optical communication with the optical splitter, and the at least one third type of output port having a multi-fiber fiber optic connector.

2. The fiber optic multiport of claim 1, further including an optical splitter, wherein the at least one first type of output port is in optical communication with the optical splitter and the at least one second type of output port is not in optical communication with the optical splitter.

3. The fiber optic multiport of claim 1, wherein the port connection indicia comprises an identification for the at least one input port.

4. The fiber optic multiport of claim 1, wherein the port connection indicia comprises an identification for ones of the plurality of output ports.

5. The fiber optic multiport of claim 1, wherein the port connection indicia is indicative of a port connection type of the plurality of output ports accessible via the respective output port.

6. The fiber optic multiport of claim 1, wherein the port connection indicia is indicative of a port connection type accessible via the at least one input port.

7. The fiber optic multiport of claim 1, wherein the port connection indicia comprises a first type of port connection indicia, a second type of port connection indicia, and a third type of port connection indicia.

8. The fiber optic multiport of claim 7, wherein the first type of port connection indicia comprises alphanumeric characters.

9. The fiber optic multiport of claim 7, wherein the second type of port connection indicia comprises a color applied to the fiber optic multiport.

10. The fiber optic multiport of claim 7, wherein the third type of port connection indicia comprises a length.

11. The fiber optic multiport of claim 1, wherein the port connection type is indicative of a drop port of the fiber optic multiport.

12. The fiber optic multiport of claim 1, wherein the port connection type is indicative of a pass-through port of the fiber optic multiport.

13. The fiber optic multiport of claim 1, wherein the port connection type is indicative of a number of optical fibers accessible at the fiber optic multiport.

14. The fiber optic multiport of claim 1, the at least one third type of output port having a multi-fiber fiber optic connector with at least two optical fibers for optical communication.

15. The fiber optic multiport of claim 1, wherein the optical splitter comprises a 1: N split ratio.

16. The fiber optic multiport of claim 1, further comprising multiple optical signal splitters.

17. A fiber optic multiport, comprising:
    a housing comprising an enclosure, wherein the enclosure defines an interior of the housing;
    a plurality of ports extended through the enclosure into the interior, wherein the plurality of ports comprises an input port and a plurality of output ports;
    a plurality of fiber optic adapters positioned in respective ones of the plurality of ports, the plurality of fiber optic adapters configured to receive and terminate fiber optic connectors at an interior connection side accessible from the interior and at an exterior connection side accessible from an exterior of the housing;
    a plurality of optical fibers disposed within the interior of the housing, each of the plurality of optical fibers connected to at least one of the plurality of fiber optic adapters at the interior connection side by a fiber optic connector coupled to an optical fiber, wherein each of the plurality of ports is configured to receive, exterior to the housing, a fiber optic cable comprising at least one optical fiber;
    port connection indicia visibly discernible from the exterior of the multiport, wherein the port connection indicia is indicative of a port connection type accessible via the respective one of the plurality of ports proximal to the port connection indicia; and
    an optical signal splitter, wherein the optical signal splitter comprises a 1: N split ratio, and the port connection type is indicative of one or more characteristics of the optical signal splitter.

18. The fiber optic multiport of claim 17, wherein the port connection indicia comprises a first type of port connection indicia, a second type of port connection indicia, and a third type of port connection indicia.

19. The fiber optic multiport of claim 18, wherein the first type of port connection indicia comprises alphanumeric characters.

20. The fiber optic multiport of claim 18, wherein the second type of port connection indicia comprises a color applied to the fiber optic multiport.

21. The fiber optic multiport of claim 18, wherein the third type of port connection indicia comprises a length.

22. The fiber optic multiport of claim 17, wherein the connection type is indicative of a drop port of the fiber optic multiport.

23. The fiber optic multiport of claim 17, wherein the connection type is indicative of a pass-through port of the fiber optic multiport.

24. The fiber optic multiport of claim 17, wherein the connection type is indicative of a number of optical fibers accessible at the fiber optic multiport.

25. The fiber optic multiport of claim 17, wherein the port connection indicia comprises an identification for the input port.

26. The fiber optic multiport of claim 17, wherein the port connection indicia comprises an identification for ones of the plurality of output ports.

27. The fiber optic multiport of claim 17, further comprising multiple optical signal splitters.

28. A fiber optic multiport, comprising:
a housing comprising an enclosure, wherein the enclosure defines an interior of the housing;
a plurality of ports extended through the enclosure into the interior, wherein the plurality of ports comprises an input port and a plurality of output ports;
a plurality of fiber optic adapters positioned in respective ones of the plurality of ports, the plurality of fiber optic adapters configured to receive and terminate fiber optic connectors at an interior connection side accessible from the interior and at an exterior connection side accessible from an exterior of the housing;
a plurality of optical fibers disposed within the interior of the housing, each of the plurality of optical fibers connected to at least one of the plurality of fiber optic adapters at the interior connection side by a fiber optic connector coupled to an optical fiber, wherein each of the plurality of ports is configured to receive, exterior to the housing, a fiber optic cable comprising at least one optical fiber;
port connection indicia visibly discernible from the exterior of the multiport, wherein the port connection indicia is indicative of a port connection type accessible via the respective one of the plurality of ports proximal to the port connection indicia; and
multiple optical signal splitters, wherein the port connection type is indicative of one or more characteristics of the multiple optical signal splitters.

29. The fiber optic multiport of claim 28, wherein the port connection indicia comprises a first type of port connection indicia, a second type of port connection indicia, and a third type of port connection indicia.

30. The fiber optic multiport of claim 29, wherein the first type of port connection indicia comprises alphanumeric characters.

31. The fiber optic multiport of claim 29, wherein the second type of port connection indicia comprises a color applied to the fiber optic multiport.

32. The fiber optic multiport of claim 29, wherein the third type of port connection indicia comprises a length.

33. The fiber optic multiport of claim 28, wherein the connection type is indicative of a drop port of the fiber optic multiport.

34. The fiber optic multiport of claim 28, wherein the connection type is indicative of a pass-through port of the fiber optic multiport.

35. The fiber optic multiport of claim 28, wherein the connection type is indicative of a number of optical fibers accessible at the fiber optic multiport.

36. The fiber optic multiport of claim 28, wherein the port connection indicia comprises an identification for the input port.

37. The fiber optic multiport of claim 28, wherein the port connection indicia comprises an identification for ones of the plurality of output ports.

* * * * *

UNITED STATES PATENT AND TRADEMARK OFFICE
CERTIFICATE OF CORRECTION

PATENT NO. : 10,877,234 B2
APPLICATION NO. : 16/190393
DATED : December 29, 2020
INVENTOR(S) : Larry Reginald Coaxum et al.

Page 1 of 1

It is certified that error appears in the above-identified patent and that said Letters Patent is hereby corrected as shown below:

On the Title Page

In Column 2, item (56), Other Publications, Lines 1-2, delete "Nov. 5, 2019;" and insert -- Sep. 5, 2019; --, therefor.

In the Specification

In Column 1, Line 11, delete "2016." and insert -- 2016, --, therefor.

Signed and Sealed this
Eleventh Day of May, 2021

Drew Hirshfeld
*Performing the Functions and Duties of the
Under Secretary of Commerce for Intellectual Property and
Director of the United States Patent and Trademark Office*